(12) United States Patent
Cruz et al.

(10) Patent No.: US 8,279,918 B2
(45) Date of Patent: Oct. 2, 2012

(54) METHOD AND APPARATUS FOR MOTION COMPENSATED TEMPORAL FILTERING USING RESIDUAL SIGNAL CLIPPING

(75) Inventors: Diego Santa Cruz, Geneva (CH); Julien Reichel, Lausanne (CH); Francesco Ziliani, Lausanne (CH)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 1535 days.

(21) Appl. No.: 11/182,582

(22) Filed: Jul. 15, 2005

(65) Prior Publication Data
US 2007/0014361 A1    Jan. 18, 2007

(51) Int. Cl.
*H04N 7/12*    (2006.01)
(52) U.S. Cl. ........... 375/240.01; 375/240.1; 375/240.11; 375/240.12; 375/240.16; 375/240.24
(58) Field of Classification Search ............. 375/240.01, 375/240.1, 240.11, 240.12, 240.16, 240.24
See application file for complete search history.

(56) References Cited

U.S. PATENT DOCUMENTS

| | | | |
|---|---|---|---|
| 6,633,676 B1 * | 10/2003 | Kleihorst et al. ............ 382/236 |
| 6,782,051 B2 | 8/2004 | Pesquet-Popescu ..... 375/240.11 |
| 2003/0026339 A1 | 2/2003 | Presquet-Popescu .... 375/240.16 |
| 2003/0035478 A1 | 2/2003 | Taubman ................. 375/240.11 |
| 2003/0058931 A1 * | 3/2003 | Zhang et al. ............. 375/240.01 |
| 2003/0202598 A1 | 10/2003 | Turaga .................... 375/240.19 |
| 2003/0202599 A1 | 10/2003 | Turaga .................... 375/240.19 |
| 2004/0008785 A1 | 1/2004 | Turaga .................... 375/240.19 |
| 2004/0042549 A1 * | 3/2004 | Huang et al. ............. 375/240.11 |
| 2004/0114689 A1 | 6/2004 | Zhang .................... 375/240.16 |
| 2005/0117640 A1 | 6/2005 | Han ....................... 375/240.03 |
| 2005/0147164 A1 * | 7/2005 | Wu et al. ................. 375/240.12 |
| 2005/0259729 A1 * | 11/2005 | Sun ........................ 375/240.1 |
| 2006/0083309 A1 * | 4/2006 | Schwarz et al. ......... 375/240.16 |
| 2007/0201561 A1 * | 8/2007 | Park et al. ............... 375/240.24 |
| 2009/0103613 A1 * | 4/2009 | Jeon et al. ............... 375/240.12 |

OTHER PUBLICATIONS

Lin Luo, "Motion Compensated Lifting Wavelet and Its Application in Video Coding", IEEE ICME; 4 pages; Aug. 2001.
Bo Feng, et al., "Energy distributed update step (EDU) in lifting based motion compensated video coding," IEEE; 0-7803-8554-3/04; pp. 2267-2270; 2004.
Daubechies, Ingrid, et al., "Factoring Wavelet Transforms Into Lifting Steps," The Journal of Fourier Analysis and Applications, vol. 4, Issue 3, 1998, pp. 247-269.
Choi, Seung-Jong et al., "Motion-Compensated 3-D Subband Coding of Video," IEEE Transactions on Image Processing, vol. 8, No. 2, Feb. 1999, pp. 155-167.

(Continued)

*Primary Examiner* — Sath V Perungavoor
*Assistant Examiner* — James Pontius
(74) *Attorney, Agent, or Firm* — MH2 Technology Law Group, LLP

(57) ABSTRACT

A method for temporal decomposition and reconstruction of an input video signal is disclosed. The method can use a prediction process and an update process in the framework of motion compensated temporal filtering (MCTF), the method can employ a block based video codec having an encoder and a decoder. A residual picture signal and a low-pass picture signal are received, the low-pass picture signal having a lesser precision than that of the residual picture signal, and in response to the residual picture signal being decoded in the decoder, the residual picture signal is clipped and reduced in precision, such that the low-pass picture signal, a reconstructed picture, and the residual picture signal have equal precisions. An inverse MCTF process, using a lifting scheme, can be performed on the clipped residual signal.

10 Claims, 7 Drawing Sheets

Lifting Scheme
(Analysis Filterbank)

OTHER PUBLICATIONS

Reichel, Julien, "Joint Scalable Video Model JSVM-2," Joint Video Team, JVT-O202, Apr. 2005, 31 pages, Busan, Korea.

Wiegand, Thomas, et al., "Overview of the H.264/AVC Video Coding Standard," IEEE Transactions on Circuits and Systems for Video Technology, vol. 13, No. 7, Jul. 2003, 19 pages.

Luo, Lin et al., "Motion Compensated Lifting Wavelet and Its Application in Video Coding," IEEE International Conference on Multimedia & Expo 2001, Aug. 2001, 4 pages.

Lim, ChongSoon et al., "Scalable Video Coding—Proposal to Reduce Memory Requirement for MCTF," Joint Video Team (JVT) of ISO/IEC MPEG & ITU-T VCEG, Apr. 2005, 7 pages.

* cited by examiner

Lifting Scheme
(Analysis Filterbank)

Inverse Lifting Scheme
(Synthesis Filterbank)

METHOD AND APPARATUS FOR MOTION COMPENSATED TEMPORAL FILTERING USING RESIDUAL SIGNAL CLIPPING

BACKGROUND OF THE INVENTION

The present disclosure relates generally to motion compensated temporal filtering (MCTF) for open loop scalable video coding, and particularly to MCTF employing prediction and update processes.

Motion Compensated Temporal Filtering (MCTF) has shown to be a very efficient tool for open loop scalable video coding as it enables open loop video coding that provides for quality scalability. The efficiency of MCTF in video coding has been recognized by standardization committees, such as MPEG (Motion Picture Experts Group). The MCTF process is separated into two sub-processes: an update process and a prediction process. Contrary to hybrid video coding, current implementations of the MCTF principle require the use of "residual buffers" in the motion compensation steps, as the picture must be updated before being used for the prediction process. As such, one of the drawbacks of the MCTF process is that additional decoding picture buffers (residual buffers that store the predicted pictures) are needed to store intermediate decoded pictures. Residual buffers introduce some practical problems as they require higher precision than those used for output pictures and updated pictures (that is, conventional picture buffers), placing higher memory demands and complicating buffer management in low-complexity implementations. A remedy to this problem is to remove totally the update process. However this introduces a penalty in compression efficiency and degrades the quality of the decoded video. Another remedy is to use two conventional picture buffers to store each residual picture, and modify the MCTF process to be able to split the residual information into these two buffers. Although this solution solves the problem of having two different types of buffers with differing precisions, it roughly doubles the amount of memory required to store residual pictures. Accordingly, there is a need in the art of MCTF that overcomes these drawbacks.

BRIEF DESCRIPTION OF THE INVENTION

An embodiment of the invention includes a method for temporal decomposition and reconstruction of an input video signal that uses a prediction process and an update process in the framework of motion compensated temporal filtering (MCTF), the motion information used for the update process being derived from the motion information used for the prediction process, and the method employing a block based video codec composed of an encoder and a decoder, the decoder having a residual buffer. A residual picture signal is received, and in response to the signal being decoded in the decoder, the residual picture signal is clipped such that the residual picture signal is reduced in precision prior to storing it in the residual buffer, thereby allowing the codec to use a conventional picture buffer that stores a reconstructed picture.

Another embodiment of the invention includes a device for temporal decomposition and reconstruction of an input video signal that uses a prediction process and an update process in the framework of motion compensated temporal filtering (MCTF), the motion information used for the update process being derived from the motion information used for the prediction process, and the device employing a block based video codec comprising an encoder and a decoder having a residual buffer, and a storage medium, readable by a processing circuit. The storage medium stores instructions for execution by the processing circuit for implementing an embodiment of the aforementioned method.

A further embodiment of the invention includes a device for temporal decomposition and reconstruction of an input video signal that uses a prediction process and an update process in the framework of motion compensated temporal filtering (MCTF), the motion information used for the update process being derived from the motion information used for the prediction process, and the device employing a block based video codec comprising an encoder and a decoder having a residual buffer. The codec is configured to facilitate the implementation of an embodiment of the aforementioned method.

BRIEF DESCRIPTION OF THE DRAWINGS

Referring to the exemplary drawings wherein like elements are numbered alike in the accompanying Figures.

DETAILED DESCRIPTION OF THE INVENTION

Embodiments of the invention take place in the framework of scalable video coding, and more exactly inside the MCTF process. An embodiment of the invention includes in the decoder a clipping of the residual picture signal prior to storing it in a picture buffer, thereby removing the requirement for higher precision buffers and allowing a codec to use only conventional picture buffers.

Alternative embodiments include encoder methods to avoid a mismatch between encoder and decoder that may result from the clipping. Such a mismatch may break the perfect reconstruction property of the MCTF, thereby generating visible artifacts. Exemplary encoder methods include: use of the same clipping at the encoder as well as at the decoder; constrained mode decision; and, constrained motion estimation. The last two exemplary embodiments apply mainly to block based video coding. Constrained mode decision modifies the usual mode decision process to avoid selecting block modes in which the residual clipping would result in breaking the perfect reconstruction property of the MCTF. Constrained motion estimation takes similar steps to avoid selecting motion vectors that would also lead to breaking the perfect reconstruction property of the MCTF.

Exemplary features of embodiments of the invention include: lowered memory requirements as opposed to elimination of the update process; the use of conventional picture buffers for storing residual pictures; the use of a single type of picture buffer for encoding and decoding, thereby simplifying buffer allocation and management; the absence of additional picture buffers being required at the decoder and encoder; and, the absence of any adverse effects on the compression efficiency of the resulting codec.

MCTF Generally

Figure 1A:
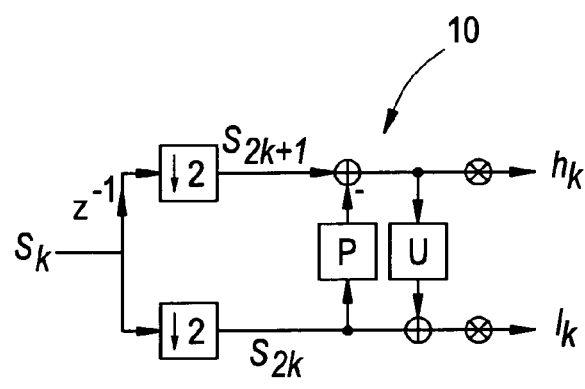
FIGS. 1A and 1B depict an exemplary lifting representation of an analysis-synthesis filter bank for use in accordance with an embodiment of the invention.
Figure 1B:
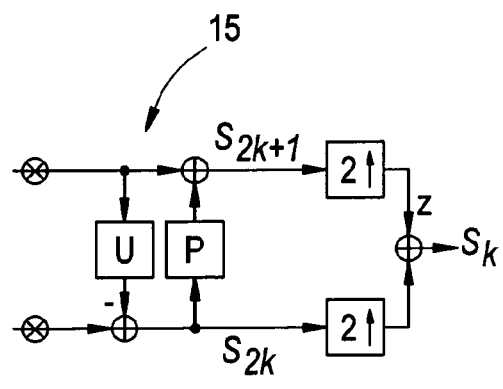

An embodiment of MCTF is based on the lifting scheme, which is described in available literature, such as: I. Daubechies and W. Sweldens, "Factoring wavelet transforms into lifting steps," J. Fourier Anal. Appl., 4(3):247—269, 1998, and S. J. Choi and J. W. Woods, "Motion-compensated 3-D subband coding of video," IEEE Trans. Image Processing, vol. 3, no. 2, pp. 155-167, February 1999, for example. The lifting scheme insures perfect reconstruction of the input in the absence of quantization of the decomposed signal. This property is valid even if non-linear operations are used during the lifting operation (motion estimation and compensation). The generic lifting scheme consists of three types of operations: polyphase decomposition, prediction(s), and update(s). In most cases, MCTF is restricted to a special case of lifting scheme with only one prediction and one update step. FIGS. 1A and 1B illustrate the lifting representation of an analysis-synthesis filter bank.

Referring now to FIGS. 1A and 1B, the analysis side (a) 10 illustrates that the polyphase decomposition splits the signal s in the even s[2k] and odd s[2k+1] signals. The odd samples s[2k+1] of a given signal s are predicted by a linear combination of the even samples s[2k] using a prediction operator P(s[2k]), and a high-pass signal h[k] is formed by the prediction residuals. A corresponding low-pass signal l[k] is obtained by adding a linear combination of the prediction residuals h[k] to the even samples s[2k] of the input signal s using an update operator U(h[k]). The high and low-pass signals are defined by Equation-1, where k represents the temporal position of the picture:

$$h[k] = s[2k+1] - P(s[2k]) \quad \text{with} \quad P(s[2k]) = \sum_i p_i s[2(k+i)] \quad \text{Eqs. -1}$$

$$l[k] = s[2k] + U(h[k]) \quad \text{with} \quad U(h[k]) = \sum_i u_i h[k+1]$$

At the synthesis side 15, the same operations are executed, but in reverse order and with inverted signs, followed by a reconstruction process using the even and odd polyphase components. Here, the reconstructed signals are given by:

$$s[2k] = l[k] - U(h[k])$$

$$s[2k+1] = h[k] + P(s[2k]) \quad \text{Eqs.-2}$$

Using s[x, k] to define a video signal with a spatial coordinate $x=(x, y)^T$ and the temporal coordinate k, the prediction and update operators for the temporal decomposition using the lifting representation of the Haar wavelet are given by:

$$P_{Haar}(s[x, 2k]) = s[x, 2k] \quad \text{Eqs. -3}$$

$$U_{Haar}(h[x, k]) = \frac{1}{2}h[x, k]$$

As used herein, x is a vector that describes the position of a pixel in a picture, and k is temporal position of the picture. Thus, for Equations 1 and 2, the [k], [2k] and [2k+1] operators may be viewed as being replaced with [x, k], [x, 2k] and [x, 2k+1] operators.

For the 5/3 transform, the prediction and update operators are given by:

$$P_{5/3}(s[x, 2k]) = \frac{1}{2}(s[x, 2k] + s[x, 2k+2]) \quad \text{Eqs. -4}$$

$$U_{5/3}(h[x, k]) = \frac{1}{4}(h[x, k] + h[x, k-1])$$

An extension of the above lifting scheme to motion-compensated temporal filtering is realized by modifying the prediction and update operators as follows:

$$P_{Haar}(s[x, 2k]) = s[x + m_{P0}, 2k - 2r_{P0}] \quad \text{Eqs. -5}$$

$$U_{Haar}(h[x, k]) = \frac{1}{2}h[x + m_{U0}, k + r_{U0}]$$

$$P_{5/3}(s[x, 2k]) = \frac{1}{2}(s[x + m_{P0}, 2k - 2r_{P0}] + s[x + m_{P1}, 2k + 2 + 2r_{P1}])$$

$$U_{5/3}(h[x, k]) = \frac{1}{4}(h[x + m_{U0}, k + r_{U0}] + h[x + m_{U1}, k - 1 - r_{U0}])$$

In Equation-5, r is a reference index, m is a motion vector, and the "0" and "1" indices associated with the prediction and update indices indicate the index of the input reference of the MCTF process. In an exemplary embodiment, only two references are used, which is referred to as a 5/3 MCTF process. Reference indices r, where r≧0, allow for general frame-adaptive motion-compensated filtering. In an embodiment, the motion vectors m are not restricted to sample-accurate displacements. In case of sub-sample accurate motion vectors, the term s[x+m, k] has to be interpreted as a spatially interpolated value.

As can be seen from the above equations, both the prediction and update operators for the motion-compensated filtering using the lifting representation of the Haar wavelet are equivalent to unidirectional motion-compensated prediction. For the 5/3 wavelet, the prediction and update operators specify bi-directional motion-compensated prediction.

In the framework of block based video coding, such as in Scalable Video Coding (SVC) described in J. Reichel, H. Schwarz, M. Wien (ed.), "Joint Scalable Video Model JSVM-2," Joint Video Team, JVT-O202, Busan, Korea, April 2005, for example, the update and prediction process also include the notion of intra and inter blocks. Intra blocks are blocks of pixels that are not modified by blocks from other pictures, while inter blocks are. Accordingly, inter blocks are modified during the prediction and/or update process, while intra blocks are not. As such, the prediction and update processes are not applied to intra blocks.

Expanding on Equations 1-5, a generic inverse MCTF process may be described by the following set of equations:

$$s_{l-1}[x, 2^l k] := s_l[x, 2^l k] - \sum_{i=0}^{N_U - 1} w_{U,i} s_l[x + m_{U,i} 2^l k + 2^{l-1} + r_{U,i}] \quad \text{Eq. -6}$$

for the update process, and $$s_{l-1}[x, 2^l k - 2^{l-1}] :=$$

$$s_l[x, 2^l k - 2^{l-1}] + \sum_{j=0}^{N_P - 1} w_{P,i} s_{l-1}[x + m_{P,j}, 2^l k + r_{P,j}] \quad \text{Eq. -7}$$

for the prediction process.

Where:

x is the vector describing the position of the pixel in the picture;

k describes the temporal position of the picture;

l describes the current temporal level, l=1 . . . L, where L=$\log_2$(GOP_size)

GOP refers to a group of pictures;

$s_l[x,2^l k]$ describes the value of the pixel at spatial position x and at temporal position 2k for the level l. In the case where x does not correspond to an exact pixel position (that is, it corresponds to a sub-pixel because of the motion vector, for example), then $s_l[x, 2^l k]$ should be interpreted as an interpolated value. As used herein, $s_l[-,2^l k]$ is referred to as the reference or input picture to the update or prediction process;

$N_P$ describes the number of inputs to the prediction process (in an embodiment, $N_P$=2);

$N_U$ describes the number of inputs to the update process (in an embodiment, $N_U$=$N_P$=2);

$m_{U,i}$ describes the motion vector displacement for the update process concerning the input i. It describes the relative position of the pixels used for the update process in the reference picture. $m_{U,i}$ may be different for each position x;

$m_{P,j}$ describes the motion vector displacement for the prediction process concerning the input j. It describes the relative position of the pixels used for the prediction process in the reference picture. $m_{P,j}$ may be different for each position x;

$r_{U,i}$ describes the temporal displacement for the update process concerning the input j. $r_{P,j}$ may be different for each position x;

$r_{P,j}$ describes the temporal displacement for the prediction process concerning the input j. $r_{P,j}$ may be different for each position x;

$w_{U,i}$ describes a weighting factor for the update process. $w_{U,i}$ may be different for each position x;

$w_{P,i}$ describes a weighting factor for the prediction process. $w_{P,i}$ can be different for each position x;

The operator x:=y signifies that the value of y is assigned to the variable x.

MCTF Levels

To process a video sequence, the MCTF scheme is applied using a recursive algorithm, thereby dividing the overall MCTF process into a series of processing levels (L). For each level, the prediction/update process is applied on all the input pictures. The outputs of the process are two set of pictures. The predicted (or high-pass) picture, represented by hk in FIGS. 1A and 1B, which are also called residual pictures, and the updated (or low-pass) picture, represented by lk in FIGS. 1A and 1B.

On the encoder side (analysis side) of FIG. 1A), the first time (first level) the MCTF is executed, the input of the process is the original picture. The second time (second level) the MCTF is executed, the input of the process is the low-pass output of the previous level, that is, the $l_k$ pictures of the first level.

On the decoder side (synthesis side) of FIG. 1B), the MCTF levels are executed in the reverse order. In this case, the outputs of a level are used as the low-pass picture input for the next reconstruction levels.

The levels are numbered from a decoder point of view, so the first MCTF level executed by the decoder is level 0, followed by level 1, and so on up to level N−1. According to this notation the encoder starts with level N−1 and finishes with level 0.

Encoding and Decoding

When coding a video sequence employing the aforementioned MCTF scheme, the concept of Group of Pictures (GOP) is generally introduced, which is used to control the delay and the amount of memory necessary to perform the MCTF process. Embodiments of the invention may use any one of three types of GOP: close GOP, open GOP and sliding GOP. The MCTF process is exactly the same inside the GOP, the main difference comes from the prediction and update process at the GOP boundary.

The close GOP structure has the advantage that each GOP may be processed in a complete independent manner from a previous GOP. However, its coding efficiency is reduced compared to the other structures because the pictures at the border of the GOP are not predicted as efficiently as the other pictures. The sliding GOP has a better coding efficiency as all pictures, regardless of their position in the GOP, go through the same type of prediction. However it introduces much larger delays and buffer requirements than the close GOP structure. The open GOP structure is a compromise between the two approaches, and is a popular choice between the three types. In open GOP, the decoded picture from the previous GOP may be used for the prediction process, but the previous GOP may not be updated anymore. In the following example illustrated in FIG. 3, the open GOP structure will be used as an example to illustrate the MCTF process, however the whole invention could be applied to any of the three structures.

Figure 3:
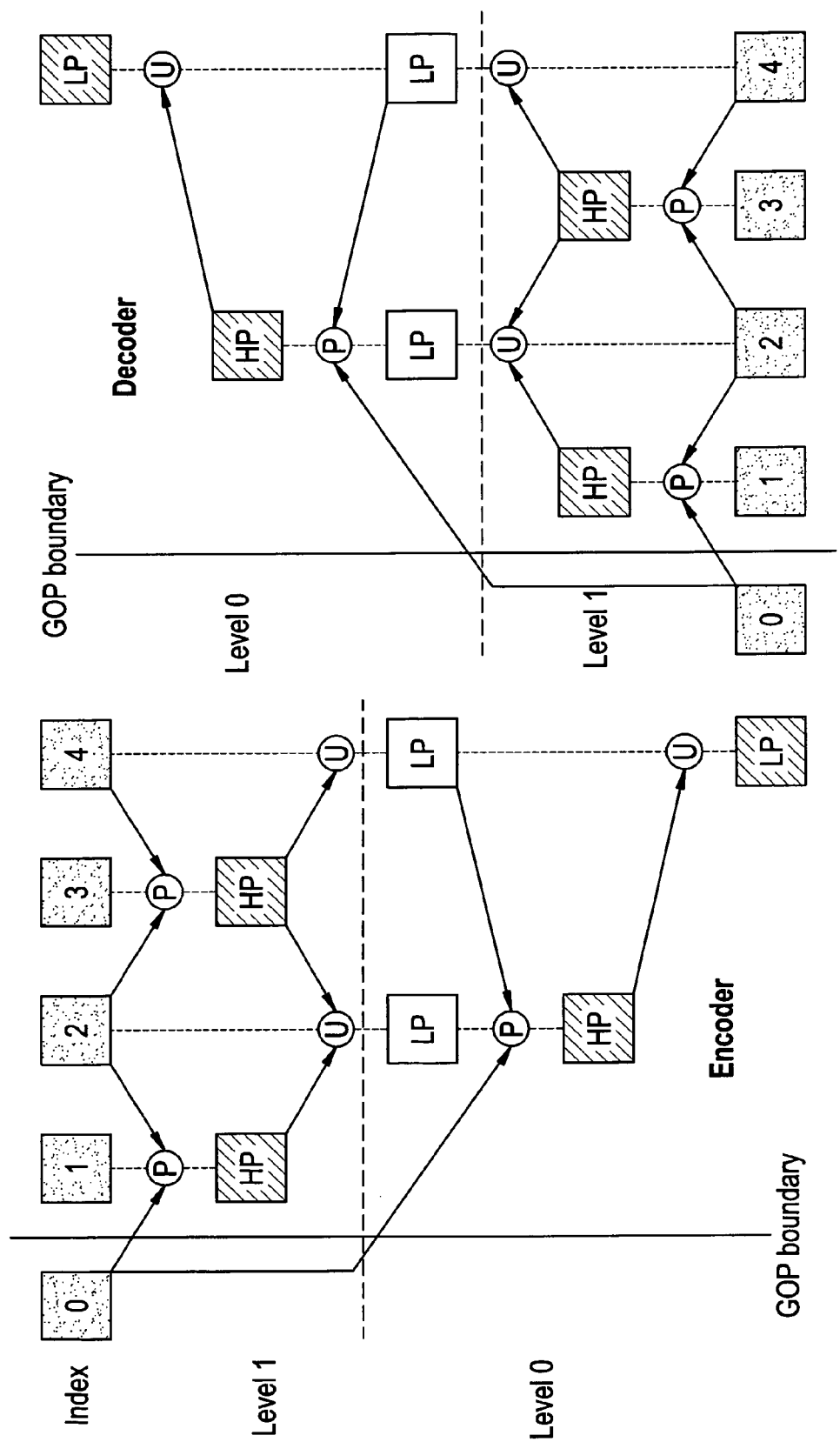
FIG. 3 depicts an exemplary process flow diagram representative of encoding and decoding processes for 5/3 MCTF using an open Group of Pictures (GOP) concept.

Referring now to FIG. 3, an example of the encoding and decoding processes for 5/3 MCTF using open GOP is depicted, where the scanning order between the encoder and the decoder are inverted. For simplification only the last picture (index 0) of the previous GOP is presented. In FIG. 3, the combination of one level of prediction and updates corresponds to the general lifting scheme illustrated in FIGS. 1A and 1B. Two levels of MCTF are illustrated both for the encoder and the decoder, which implies a GOP size of 4 pictures.

In FIG. 3, gray-shaded squares represent original pictures (with their index) on the encoder side, and reconstructed pictures on the decoder side. Cross-hatched squares represent the transmitted pictures. High-pass (residual) pictures are labeled HP, low-pass pictures as labeled LP. Predict and update processes are depicted by the circles labeled P and U, respectively.

During the first level of the MCTF encoding process, two prediction processes are executed on pictures 1 and 3, then two update processes are executed on picture 2 and 4. During the second level of the MCTF encoding process, picture 2 is predicted and picture 4 is updated.

It should be noted that in this example picture 0 is not updated, since it belongs to a previous GOP. On the decoder side, the MCTF levels are performed in the reverse order. That is, first picture 4 is updated and picture 2 is predicted. The same process is applied to the next level of MCTF.

It should also be noted that even if the same word (predict or update) is used for the encoder and decoder, the operations are actually different, which can be seen by referring back to FIGS. 1A and 1B. As illustrated by FIGS. 1A and 1B, when the encoder (analysis side 10) executes the prediction process, it subtracts the reference from the current block, whereas the decoder (synthesis side (b)) adds the reference to the current block. The same principle is applied to the update process, which adds the predicted block to the reference block at the encoder, but subtracts it at the decoder.

Motion Compensation

In MCTF, both the update and predict processes need motion fields to perform motion compensation (MC). The predict and update motion fields are different as they compensate in inverse directions. Hence, one is inverted compared to the other. As MCTF is used in the framework of video coding, it is desirable to avoid the encoding of both motion fields. In order to do so, an update motion field is derived from the corresponding predict motion field by an inversion procedure specific to the coding method. Many such inversion procedures have been proposed, such as those described in J. Reichel, H. Schwarz, M. Wien (ed.), "Joint Scalable Video Model JSVM-2," Joint Video Team, JVT-O202, Busan, Korea, April 2005, for example, which may be applied to embodiments of the invention.

A task of the encoder is to produce the motion fields required for the MCTF process. This is done through a procedure known as motion estimation (ME), which finds the best motion field subject to the encoder's optimization criteria. As the update motion field is derived from the predict motion field, ME is applied only to find the predict motion field. When bi-directional predicts are used, as in the 5/3 MCTF, two motion fields are required per predicted picture. In the framework of block based video coding, ME finds the motion vector that minimizes the difference between the predicted and reference picture for each block.

In typical block based video codecs, such as H.264/AVC (as described in T. Wiegand, G. J. Sullivan, G. Bjøntegaard and A. Luthra, "Overview of the H.264/AVC Video Coding Standard," in *IEEE Trans. on Circuits and Video Technology*, vol. 13, no. 7, pp. 560-576, July 2003), MPEG standards (as described in T. Sikora, "MPEG digital video-coding standards," in *Signal Processing Magazine*, vol. 14, no. 5, pp. 82-100, September 1997), and SVC, a different prediction mode may be selected for each block. These modes may locally switch between unidirectional or bi-directional prediction (that is, Haar or 5/3 MCTF, respectively) or even employ intra prediction. An intra block is predicted from the samples in neighboring locations of the same picture, and thus is not subject to MCTF processing. In addition to specifying the prediction process, the block based video codec may also specify variations of the prediction process, such as explicitly coded or implicit motion vectors predicted from neighboring blocks (spatially and/or temporally), for example. The process by which the encoder selects the mode for each block is referred to as mode decision (MD). This process selects the best block mode, subject to the encoder's optimization criteria.

Execution of the MCTF Process

Conventionally the decoder uses a picture based approach for the inversion of the motion fields, and a GOP based approach for the execution of the whole MCTF process.

The overall description of conventional MCTF decoding corresponds generally to the following:

Decode all pictures of the GOP. For high-pass pictures, decode the texture and the motion information independently.
For each level of the MCTF transform, do the following:
Inverse the motion field used to predict the high pass picture of the current level
Execute the inverse update of the low-pass pictures
Execute the inverse prediction of the high-pass pictures It should be noted that this process implies the following: the motion information and the residual (high-pass) information must be stored during the decoding process; and, the inversion of the motion field and the update process requires the whole picture/motion field to be available before the processing can be started.

In an embodiment, the MCTF algorithm may be executed as follows:
receive and decode pictures $s_L[-, 2^L k]$
for l=L to 1 do:
  for k=1 to GOP_size/$2_l$
  receive and decode all pictures $s_l[-,2^l k-2^{l-1}]$
  for k=1 to GOP_size/$2^l$
    for all pixels at position x of the picture at position $2^l k$
      execute the update process of equation (1)
    for k=1 to GOP_size/$2^l$
    for all pixels at position x of the picture at position $2^l k$
      execute the prediction process of equation (2)

In an embodiment, the aforementioned execution is "level" based.

There are, however, algorithms that are "picture" based, and execute the prediction and update processes on the picture. In this case the resulting values are the same, but the order of the operation is different. The generic expression of the picture based algorithm depends on which pictures are used in the summation of the prediction and update process.

A general principle of the picture based algorithm is the following:
Do, until all pictures $s_0[-,k]$ are available
receive a picture (which picture is to be received depends on the content of the Equations 6 and 7)
Step-1: For each available picture do:
if all the input of Equation-6 are available execute it
Step-2: For each available picture do:
if all the input of Equation-7 are available execute it
Got back to step 1, until no equations are executed.

Figure 2:
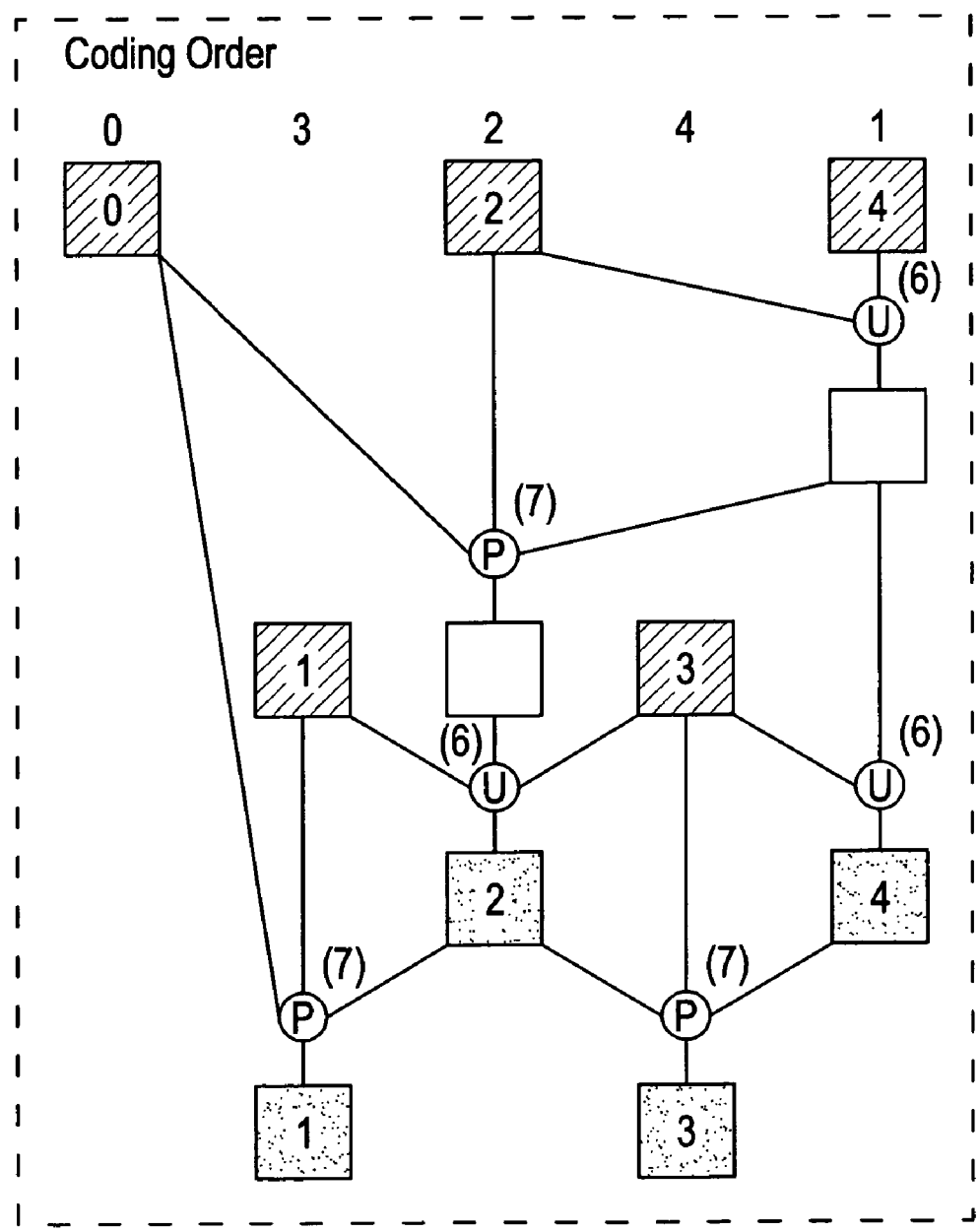
FIG. 2 depicts an exemplary process flow diagram representative of an algorithm for a MCTF process.

For example in the situation where the Equations 6 and 7 are reduced to using at most two pictures, the algorithm may be as depicted in FIG. 2. As used herein, a numbered box refers to a picture. In the MCTF process of FIG. 2, the cross-hatched squares represent a received picture, the number at the top of the figure represents the coding order, the numbers inside the squares represent the picture index, and the numbers in the parenthesis represents the above noted equation used in the process. In this process, the decoder operations are as follows:
Receive picture with index 4
Receive picture with index 2
Execute Equation-6 with l=2, k=1 for all pixels of the picture
Execute Equation-7 with l=2, k=1 for all pixels of the picture
Receive picture with index 1
Receive picture with index 3
Execute Equation-6 with l=1, k=1 for all pixels of the picture
Execute Equation-7 with l=1, k=1 for all pixels of the picture
Execute Equation-6 with l=1, k=2 for all pixels of the picture
Execute Equation-7 with l=1, k=2 for all pixels of the picture In considering the whole decoding of a GOP, the decoder typically waits for multiple pictures to be received in order to execute the update process. For instance, and referring now to FIG. 4, which employs an inverse 5/3 MCTF process for a GOP of size eight, the decoding process may be described as follows:
The reconstructed picture 0 is available from the decoding of the previous GOP
Receive picture 4
Receive picture 8
Use picture 4 to update and modify picture 8
Use picture 8 and 0 to predict and modify picture 4
Receive picture 2
Receive picture 6
Use picture 2 and 6 to update and modify picture 4
Use picture 0 and 4 to predict and modify picture 2
Use picture 6 to update and modify picture 8
Use picture 4 and 8 to predict and modify picture 6

Receive picture 1
Receive picture 3
Use picture 1 and 3 to update and modify picture 2; the resulting picture 2 is the reconstructed picture 2
Use picture 2 and 0 to predict and modify picture 1; the resulting picture 1 is the reconstructed picture 1
Repeat the reconstruction process for pictures 3-8.

Figure 4:
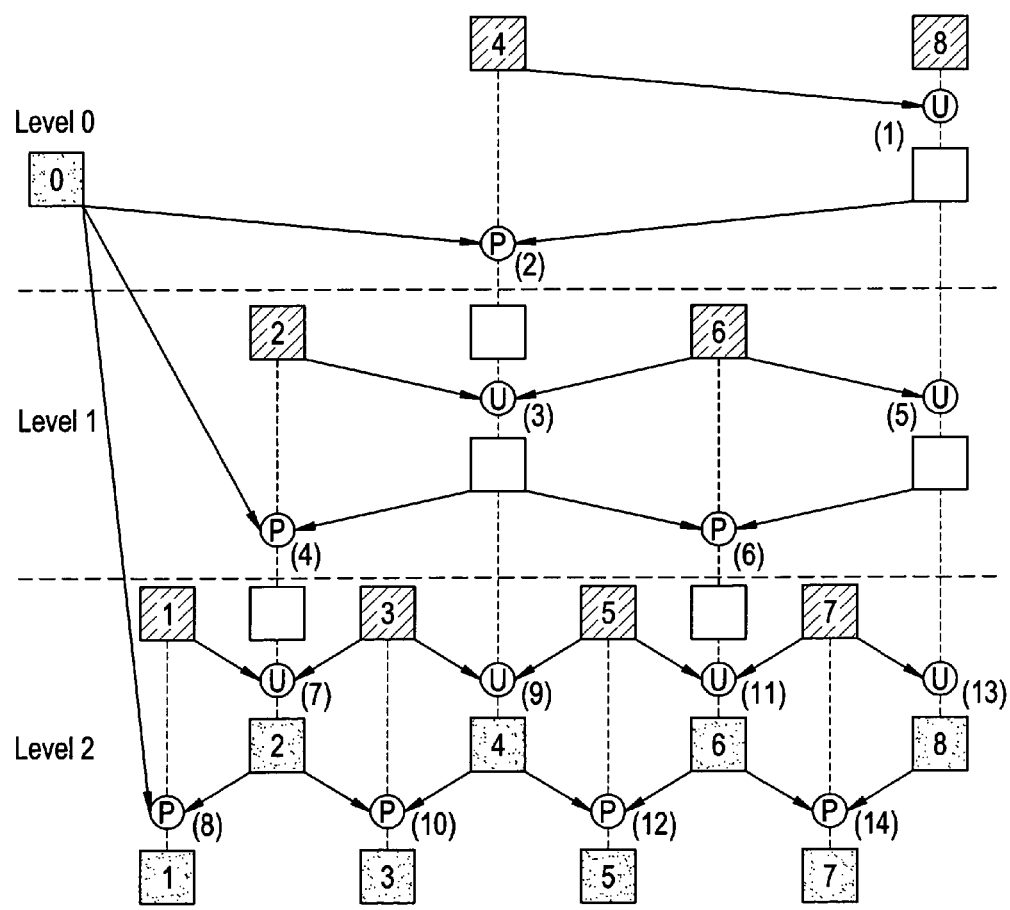
FIG. 4 depicts an exemplary process flow diagram representative of an inverse 5/3 MCTF process for a GOP of size eight.
Figure 5:
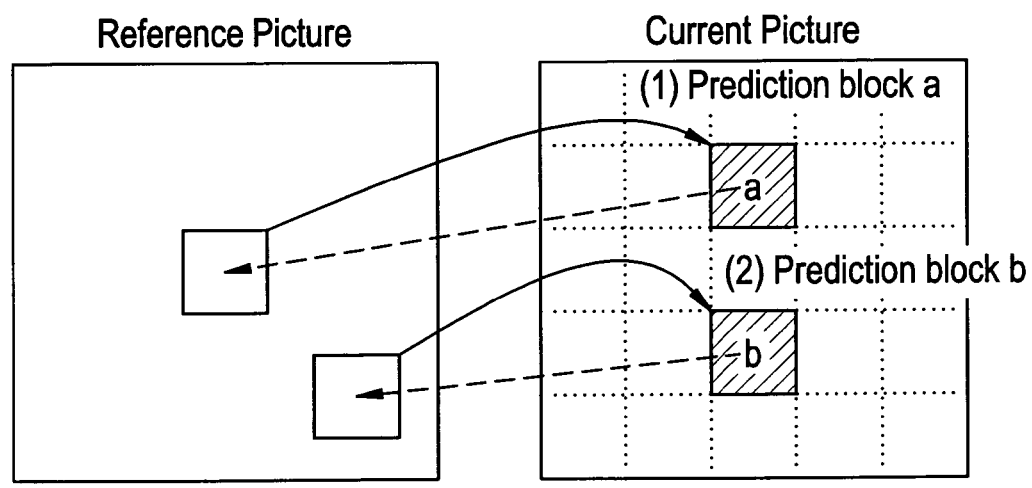
FIG. 5 depicts an exemplary prediction process using block-by-block decoding.

In FIG. 4, cross-hatched squares represent received pictures, gray-shaded squares represent reconstructed pictures, the number inside a square represents the index of the picture, and the numbers between parentheses represent an example of the execution order of the update and prediction process. Depending on the interaction between the different pictures, it is possible to compute the MCTF inverse operations before all the pictures of the GOP have been received. For instance, when all pictures of a level have been received, then the inverse MCTF process for this level may be executed. Furthermore, it is not necessary to wait for all pictures of a level to be available before some part of the inverse MCTF process can be executed. An example of such processing is shown in FIG. 4, where picture 1 may be predicted immediately after picture 3 is received and 2 is updated. As such, it is not necessary to wait for all the pictures of the Level-2 (1, 3, 5 and 7) to be received before starting the processing.

From the above described reconstruction process, it can be seen that some of the pictures must be stored before they can be predicted or updated. For instance, picture 1 must be stored as a residual (high-pass) picture until picture 3 has been fully decoded and used to update and modify picture 2. As used herein, buffers used to store residual pictures, either because of the computation of the update process or because some pictures have not yet been received for the execution of the process itself, will be referred to as residual picture buffers, or residual buffers for short.

Problems Associated with Residual Buffers

The use of residual buffers for storing residual pictures has the following implications on the execution of the decoding process:

As the residual picture contains differential information, the residual picture buffers need to have a higher bit-depth than a conventional decoding buffer to avoid data loss. Typically, for an 8 bit video, the residual buffers should be at least 9 bits.

The execution of the update and prediction processes is not constrained by the receiving order. Thus, it is very possible that for some input, no update and prediction can be performed, whereas for other input, and depending on the structure of the MCTF, more than one update needs to be performed.

The fact that the residual picture must be stored, and the prediction is executed only when another (or even more than one) picture is received, additional delay is added to the decoding process.

The decoding process is executed on a picture basis, and not on a block basis.

The maximum number of possible residual buffers needs to be available to the decoder.

The aforementioned constraints on the decoding process may have some of the following impacts on the software and hardware implementation of the process:

The fact that the decoding is based on pictures and not on blocks may be a problem for devices with limited resources in terms of memory capacity and/or bandwidth.

The fact that the residual information needs to be stored in a buffer with higher bit-depth than conventional buffers may be a problem for all environments with limited memory resources.

The irregular execution of the update and prediction process means that either the decoder should be designed with a processing power capable of executing the process in the worst case scenario (over-dimensioning), or that an additional delay must be introduced during the decoding to flatten the processing power needs.

The additional delay introduced by the buffering may be a problem for all video systems requiring a low delay, like interaction with the scene or bi-directional communication for example.

Two types of buffers are necessary for the decoding process, which may double the amount of buffer memory necessary for the decoding process.

A solution proposed in the literature, such as that described in L. Luo, J. Li, S. Li, Z. Zhuang, and Y.-Q. Zhang, "Motion compensated lifting wavelet and its application in video coding," in *IEEE ICME*, pp. 365-368, 2001, for example, is to remove the update process entirely. While this solution may alleviate the above noted problems, it may also have adverse effects on the compression efficiency of the codec. Other solutions, such as that described in C. S. Lim, M. H. Lee, S. M. Shen, S. Kondo, "Scalable Video Coding-Proposal to reduce memory requirement for MCTF," Joint Video Team, JVT-O028, Busan, Korea, April, 2005, for example, proposes to distribute the residual picture information between two conventional picture buffers and modify the MCTF process to be able to split the residual picture between these two buffers. While this solution eases the buffer management as there is only one type of buffer, it still requires an increased amount of memory as two conventional buffers are required for each stored residual picture.

Residual Buffer Clipping

As previously discussed, embodiments of the invention include a method of residual buffer clipping that limits the precision of residual buffers with little or no effect on the quality of the reconstructed frames. Using this method, a decoder may store the residual pictures in the same type of buffers used to store reconstructed pictures, and thus lower the memory needs and simplify the buffer management.

To limit the distortion that may be induced by residual buffer clipping, where the perfect reconstruction property of the MCTF may be broken, alternative embodiments of the invention also include two encoder processes, constrained mode decision and constrained mode estimation, that will be discussed in more detail below.

For purposes of this discussion relating to residual buffer clipping, the previously presented Equations-1 and 2 (the high-pass and low-pass signals in MCTF), repeated below for convenience as:

$$h[k] = s[2k+1] - P(s[2k]) \quad \text{with} \quad P(s[2k]) = \sum_i p_i s[2(k+i)] \quad \text{Eqs. -1}$$

$$l[k] = s[2k] + U(h[k]) \quad \text{with} \quad U(h[k]) = \sum_i u_i h[k+1]$$

and, $$s[2k] = l[k] - U(h[k]) \quad \text{Eqs. -2}$$
$$s[2k+1] = h[k] + P(s[2k])$$

will now be reformatted as follows:

$$h[x,k] = s_o[x,k] - P(s_e,x,k),$$

$$l[x,k] = s_e[x,k] + U(h,x,k). \quad \text{Eqs.-8}$$

and, $$\hat{s}_e[x,k] = \hat{l}[x,k] - U(\hat{h},x,k),$$

$$\hat{s}_o[x,k] = \hat{h}[x,k] + P(\hat{s}_e,x,k), \quad \text{Eqs.-9}$$

where Equations-8 are directed to the decomposed picture signals at the encoder, and Equations-9 are directed to the reconstructed picture signals at the decoder, and where the ^ denotes the decoded values of the signals, including quantization noise.

The signal $s_e[x,k]$, where subscript e denotes an even signal and subscript o denotes an odd signal, may be either an original picture or a low-pass picture produced by a previous level of MCTF. In both cases, the nature of the signal is the same and thus may be represented and stored with the same precision in a conventional buffer. As used herein, b represents the number of bits of such a representation (usually b=8), and P(s,x,k) is a weighted average of temporal neighboring pictures. As the high-pass signal h[x,k] represents the difference between a picture and an average picture, a higher precision of b'≧b+1 bits is required to represent the high-pass signal in order to avoid an overflow. In order to avoid the increased precision requirements, an embodiment of the invention clips the high-pass signal samples to b bits of precision just after the sample is decoded and before it is stored in the residual buffer. Thus, the decoded residual pictures may be stored in the same conventional buffers as low-pass and output pictures, thereby removing the limitations imposed by the residual buffers previously discussed.

In an embodiment, the clipping is performed as follows:

$$\hat{h}_C[x,k] = C(\hat{h}[x,k]),\qquad\text{Eq.-10}$$

where C is a clipping function, and the values $\hat{h}_C[x,k]$ are stored in the residual buffer. In an embodiment, the clipping function C is defined as:

$$C(w) = \begin{cases} A_{min} & \text{if } w < A_{min}, \\ A_{max} & \text{if } w > A_{max}, \\ w & \text{otherwise,} \end{cases}\qquad\text{Eq.-11}$$

where $A_{min}$ and $A_{max}$ are the minimum and maximum values, respectively, that may be represented with b bits of precision in signed form, and w is the attribute of clipping function C of Equation-10.

The decoder's inverse MCTF process is then applied unmodified using the clipped high-pass signal $\hat{h}_C$ as follows:

$$\hat{s}_e[x,k] = \hat{l}[x,k] - U(\hat{h}_C,x,k),$$

$$\hat{s}_o[x,k] = \hat{h}_C[x,k] + P(\hat{s}_e,x,k).\qquad\text{Eq.-12}$$

Introducing the clipping function destroys the perfect construction properties of the MCTF process because it introduces an operation on the high-pass signal $\hat{h}[x, k]$ and not in the prediction or update steps directly.

Knowledge that the decoder will clip (that is, anticipated clipping of) the high pass signal may be used on the encoder side to prevent it from sending unnecessary information. Moreover, it is desirable that the clipped high-pass signal be used at the encoder during the update process so that the encoder process is closer to (closely matched to) the process of the decoder. Accordingly, the encoder side MCTF process may be modified as follows:

$$h_C[x,k] = C(s_0[x,k] P(s_e,x,k)),$$

$$l[x,k] = s_e[x,k] + U(h_C[x,k]).\qquad\text{Eqs.-13}$$

It should be noted that most implementations of the update process include a truncation of the high pass signal during the update in order to reduce the artifacts introduced by the MCTF on the low pass picture, and that the perfect reconstruction property of the MCTF in the absence of quantization noise is only maintained for the odd pictures of a MCTF level if C(h[x,k])=h[x,k] for all positions x, which is typically the case since the motion estimation and mode decision processes seek to minimize the mean amplitude of the high-pass signal for each block.

It should also be noted that even if C(h[x,k])=h[x,k] is verified for all positions x at the encoder, it may occur that $C(\hat{h}[x,k]) = \hat{h}[x,k]$ is not always satisfied at the decoder, due to quantization noise, resulting in some additional distortion.

As previously discussed, the residual buffer clipping process breaks the perfect reconstruction property of the MCTF wherever the relation $C(\hat{h}[x,k]) = \hat{h}[x,k]$ is not verified, which is rarely the case. However, in the event that is does occur, a visible distortion may appear on the reconstructed pictures.

In an experimental study involving the aforementioned modifications applied to the encoder and decoder, the observed drop in peak-signal-to-noise-ratio (PSNR) was no more than 0.07 dB, and was typically about 0.02 dB, over a wide range of qualities and video sequences. The mean degradation introduced by the residual buffer clipping process may therefore be considered negligible.

In another experimental study involving an embodiment of the invention, reconstructed pictures using conventional MCTF and the herein described buffer clipping process were compared. The comparison involved a coded picture at CIF resolution (352×288), and was between: (a) a reconstructed image using the buffer clipping process, (b) a reconstructed image using a conventional MCTF process and higher precision residual buffers, and (c) the original picture. In general, no major artifacts were found to be visible. While some minor artifacts were found to be visible when buffer clipping was applied and image detail was magnified, these kinds of artifacts appeared only occasionally and were restricted to fast moving objects with high contrast.

To address these rare but undesirable minor artifacts, alternative embodiments of the invention may employ other measures that may be incorporated at the encoder, which will now be discussed in more detail.

Constrained Mode Decision

As previously discussed, a block based video encoder usually uses a mode decision process to select between inter (that is, MCTF) and intra modes for each block, and among the different inter modes (for example, bi-directional vs. uni-directional prediction) for each block.

In an embodiment of the invention, the mode decision process is modified in order to avoid blocks in which the residual buffer clipping process may introduce distortion such as that discussed above. This modification to the mode decision process is as follows:

Let $$d_{max} = \max_{x \in B} |C'(\tilde{h}[x,k]) - \tilde{h}[x,k]|,\qquad\text{Eq. -14}$$

where B is the block being considered and $\tilde{h}[x,k]$ is an estimation of the signal $\hat{h}[x,k]$ that will be received at the decoder. The function C' is defined as C above, but using $A'_{min}$ and $A'_{max}$ limits instead of $A_{min}$ and $A_{max}$, respectively, with $A'_{min} \geq A_{min}$ and $A'_{max} \leq A_{max}$.

For each inter mode considered for a block B, the mode decision process checks that $d_{max}=0$ is verified. If not, the considered mode is forbidden and not selected for block B.

It should be noted that the function C' is allowed to have tighter bounds than C in order to compensate for inaccuracies in the estimate $\tilde{h}[x, k]$.

Since the blocks in intra mode do not undergo MCTF, and are therefore not subject to the above condition, it is always possible to select a valid mode for a block if the codec supports intra blocks. Otherwise, the mode decision process should select an inter mode that has the smallest $d_{max}$ value, or for which $d_{max}$ is below a pre-determined threshold, in order to minimize the distortion.

In an experimental study, reconstructed pictures using the buffer clipping process with and without the constrained mode decision were compared to the original picture. The comparison involved: (a) coded and decoded pictures using the buffer clipping process, (b) coded and decoded pictures using conventional MCTF process with higher precision residual buffers, (c) the original picture, and (d) coded and decoded pictures using the buffer clipping process and the constrained mode decision. A comparison of the resulting pictures showed that the artifacts originally introduced by the buffer clipping process were completely eliminated. The experimental study also showed that the PSNR values were not modified by the constrained mode decision.

Constrained Motion Estimation

In an alternative embodiment, the motion estimation process is modified (constrained) in order to avoid motion fields that generate blocks in which the buffer clipping process could introduce distortion while incurring the least rate-distortion penalty. In an embodiment of the invention employing constrained motion estimation, the typical motion estimation process is modified.

An embodiment would usually apply constrained mode estimation in addition to the constrained mode decision, although both modified processes may be applied independently.

For example, for each motion vector considered for a block B, check that $d_{max}=0$ is verified. If not, then the considered motion vector is forbidden and not selected. In the case that no motion vector satisfies this condition, the motion estimation process should select a motion vector that has the smallest $d_{max}$ value, or for which $d_{max}$ is below a pre-determined threshold, in order to minimize distortion.

It should be noted that in the motion estimation process, the estimate $\tilde{h}[x, k]$ is different from that used during mode decision, and is usually just $h[x,k]$.

In an experimental study, it has been shown that using constrained motion estimation in addition to constrained mode decision slightly reduces the drop in PSNR by about 0.02 dB, which can be considered negligible. With encoders in which a simpler mode decision process is used (for example, the rate-distortion cost is approximated instead of measured), using constrained motion estimation may deliver a larger improvement.

Considerations for Alternative Embodiments

Block Processing Order

Figure 6:
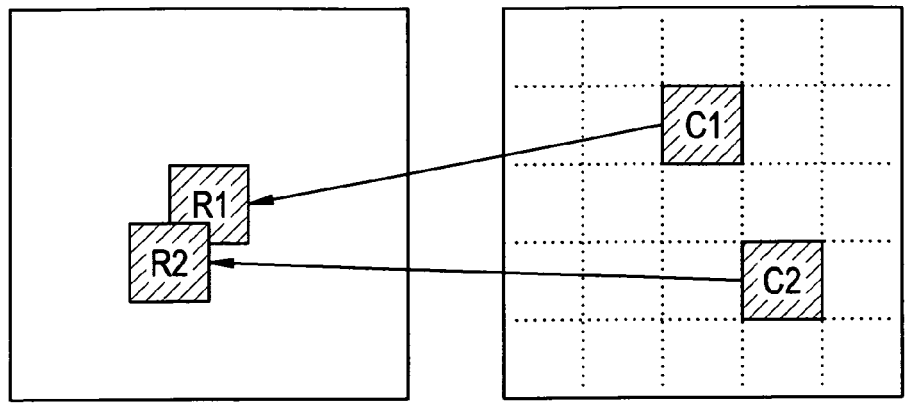
FIG. 6 depicts an exemplary motion field with overlapped reference blocks.

A problem that may arise when there is overlap in the prediction motion field is that more than one block in the original picture may use the same block, or part of it, in the reference picture. An example of such case is illustrated in FIG. 6. In this situation, block C1 and C2 have references R1 and R2 that are overlapping. However, as the block R1 will be updated during the prediction of C1, when the block C2 is to be decoded, part of the information in R2 will already have been modified. As such, the overlapped region will be updated twice.

Although a region may be updated twice, this is not a problem in itself. Due to the structure of the MCTF, both the encoder and the decoder use the same strategy for the update process, thus the transform is still reversible if the operations are performed in the reverse order at the decoder compared to how they were done at the encoder.

Since the update process may be interpreted as a computation of an average between a current picture and a reference picture, the updated block may be interpreted as an average between the block of the current picture and the block of the reference picture. A region in the reference picture being updated twice is then simply the average between two times the reference picture and each one of the regions in the current picture. Thus, as long as the energy of the residual picture used for update is not too large, multiple updates of some regions will not be of concern with respect to system performance.

However, in order to avoid a difference between the picture used in the encoder and the one used in the decoder, the scanning order of the block is of importance. A purpose of an in-place update process is to reduce the memory needed during the decoding process. Thus, the encoder to uses a reverse scan order for execution of the prediction and update processes.

As such, the encoding process becomes:

Scan the blocks in the reverse scan order, and for each block:
Do the prediction process for the block
Do the update process for the block
Scan the blocks in the normal scan order and for each block:
Do the encoding of the block.

In order to avoid a mismatch between the encoder and the decoder, the encoder uses the updated reference for the prediction of each block. Thus, in the example of FIG. 6, the encoder will do the following operations:

Predict the block C2 using the original block R2
Update the whole block R2 using C2
Predict the block C1 using the partially updated block R1
Update the whole block R1 using C1.

The decoder will do the same operations, but in the reverse order, that is:

Update the whole block R1 using C1
Predict the block C1 using the partially updated block R1
Update the whole block R2 using C2.
Predict the block C2 using the original block R2.

Limiting the Impact of the Update Process

A purpose of the update process is to distribute the compression noise across the encoded picture to control the drift. In view of this purpose, it is desirable not to use large residual values during the update process. To prevent this from happening, a threshold or a weighting function may be applied to the residual data before using it for the update process. This may be more significant in situations involving an in-place update process, since a block (or even a whole picture) may be updated from more than one source. Here, it is desirable for the threshold to be more selective than in conventional update process so as to avoid additional artifacts caused by the multiple updates.

In situations involving a threshold or weighting function, the update process becomes:

$$s[x,2k]:=s[x,2k]-\beta T(s[x+m_{U1},2k-1]), \qquad \text{Eq.-15}$$

where T(s) is any function introducing a saturation on the maximum value of the signal s.

Constraints on the Update Process

As previously discussed, embodiments have been described that remove the need for having residual buffers on the decoder side. However, each one of those embodiments typically introduces some constraints on the encoding order (of the pictures or of the blocks). In some environments, it may be desirable to simplify not only the decoding process, but also the encoding one.

In an embodiment, the picture coding order introduced by the split update process removed the need for residual buffers on the decoder side, but not on the encoder one. Thus, in order to remove the need for residual picture buffers on the encoder side, additional constraints should be placed on the MCTF structure. In an embodiment, constraining the update to be limited to a single picture removes the need for residual buffers on the encoder side, which is described in more detail below.

The block coding orders introduced by the local update process results in the encoder scanning the picture twice, once in a reverse scan order for executing the prediction and updates processes, and once in a normal scan order for the coding of the blocks themselves. Contrary to what this may imply, twice scanning the picture is not an increase in complexity as compared to a conventional picture based update, where the picture is also scanned more than once. However, for some applications it may be interesting to also have an encoder capable of scanning each block only once. In an embodiment, such a configuration is possible if a reference pixel can be updated only by a single source, which is discussed further below.

Picture Coding Order

The constraints on the coding order of a picture may be removed if a picture can be updated only from a single source.

Figure 7:
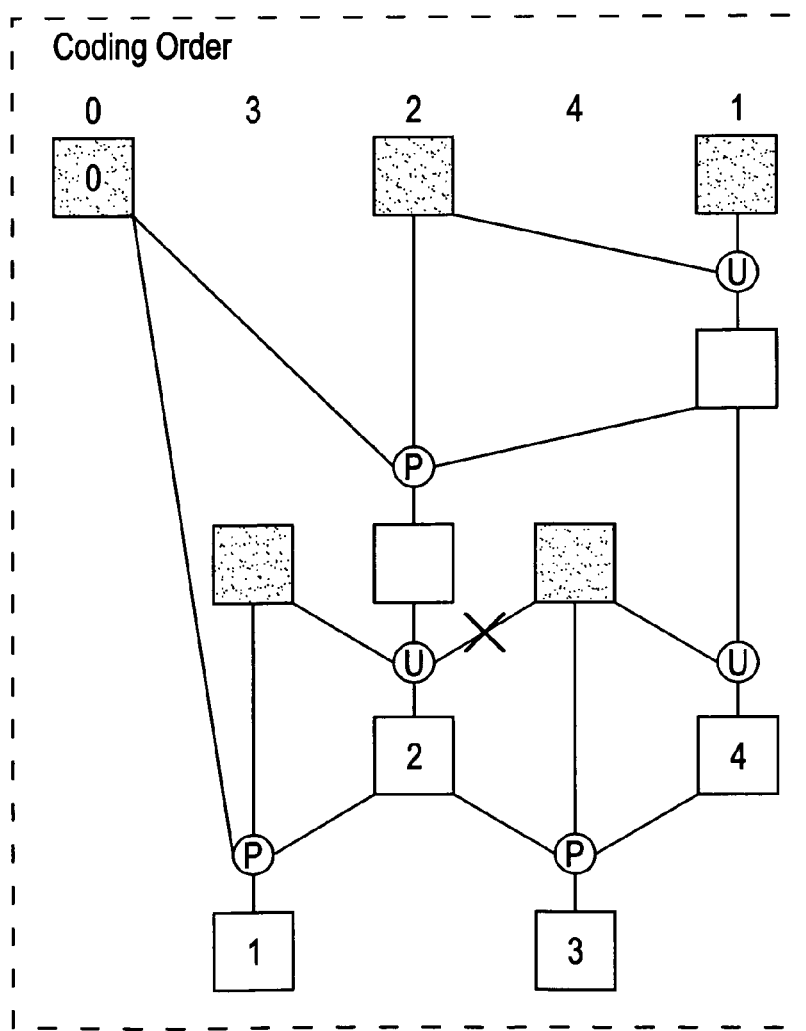
FIG. 7 depicts an exemplary 3/3 MCTF process where backwards updates are not permissible.

An embodiment suitable for such an implementation is depicted in FIG. 7, which is referred to as 3/3 MCTF. Here, a backwards update is not permissible, and the encoding and decoding processes are described as:

Picture 0 is encoded
The picture 1 is predicted from picture 0 and picture 2
The picture 1 is used to update picture 2
The picture 3 is predicted by updated picture 2 and 4
The picture 3 is used to update picture 4
Picture 2 is predicted by picture 0 and updated picture 4
Picture 2 is used to update picture 4 once more
Picture 4 is encoded
Picture 2 is encoded
Picture 1 is encoded
Picture 3 is encoded
for the encoder, and in the reverse order:
Picture 0, 4, 2 are received
Picture 2 is used to update picture 4
Picture 2 is predicted from picture 0 and 4
Picture 1 is received
The picture 1 is used to update picture 2
The picture 1 is predicted from picture 0 and picture 2
Picture 3 is received
The picture 3 is used to update pictures 4
The picture 3 is finally predicted by pictures 2 and 4 for the decoder.

By disallowing an update from multiple sources, the complexity of the decoder is also reduced, since at most one update process will be called per input picture.

By introducing this constraint, however, some impact on the compression efficiency for some video sequences may be experienced. For example, sequences with large camera motion and high temporal correlation may experience a loss of compression efficiency of about 2%. However, this is still less than the loss of compression efficiency from the complete removal of the update process, which incurs compression efficiency losses of about 10-15%.

Block Processing Order Revisited

To remove the constraint on the block processing order, a pixel should be updated from only a single source. Additionally, care should be taken if a pixel is used in the prediction of two different blocks.

For example, and with reference to FIG. 6, C1 is used to update the whole R1 block, while C2 updates only the part of the R2 block that is not overlapping with R1. In this embodiment, once a pixel has been updated it cannot be updated a second time. Using this constraint, the decoder and the encoder maintain an additional map of the updated pixel, where the map keeps trace of the updated pixels. To reduce the complexity of this embodiment, the pixel based map may be simplified and approximated by a block (or sub-block) based map. For example, if it is assumed that the motion compensation process is based on 16×16 block, it would be sufficient to keep a map for 4×4 blocks.

To avoid a mismatch between the encoder and the decoder, the original picture should be used for the prediction process, even if a block as already been updated.

In an exemplary embodiment, update/prediction process pseudo code for integer pixel accuracy and direct inversion may be modified as follows:

For each pixel at position x in the current block do:
Compute the position of the reference pixel y=floor(x+ $MV_P(x)$).
If the reference pixel at position y is not marked as updated
Compute the update motion $MV_U(y)$
Update the pixel at position y using $MV_U(y)$
Mark the pixel at position y as updated.
For each pixel at position x in the current block do:
Predict pixel at position x using MVP(x).

For the EDU algorithm, the update equation may be modified as follows:

$$s[y, 2k] := s[y, 2k] - \beta\left(\sum_{x \in B} w'_{x,y} s[y, 2k+1]\right), \quad \text{Eq. -16}$$

were $w'_{x,y}$ is equal to $w_{x,y}$ if M(y)=0, and zero if M(y)=1. M(y) is initially set to 0 for all y. Then, after each block, M(y) is set to 1 for all y for which $w_{x,y}$ is not equal to zero.

Thus, using the exemplary embodiment of FIG. 6, the encoder process would be:

Predict C1 using R1
Update the whole R1 block using C1
Predict C2 using the original R2 block (for the overlapped region with R2, do not use the updated pixels)
Update the parts of R2 that are not overlapping with R1 using C2.

The decoder would process the block in the same order, but in the reverse order to the predictions and the updates, that is:

Update the whole R1 block using C1
Predict C1 using R1
Update the part of R2 that are not overlapping with R1 using C2
Predict C2 using R2 (in this case no special care must be taken, because R2 corresponds to the original image).

System

Figure 8:
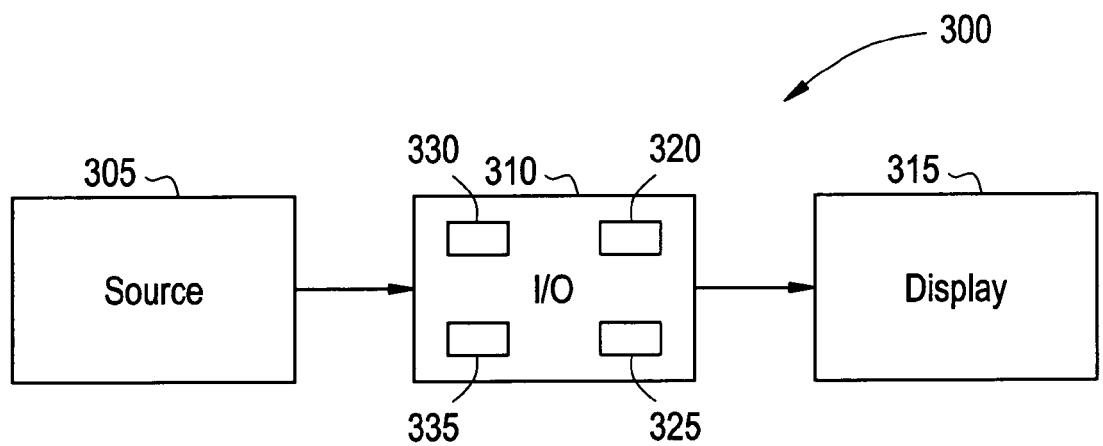
FIG. 8 depicts a system for use in accordance with an embodiment of the invention.

As depicted in FIG. 8, an embodiment of the invention includes a system 300 in which temporal decomposition and reconstruction of an input video signal may be practiced in accordance with an embodiment of the invention by implementing the method illustrated by Equations 8-14, which uses a prediction process and an update process in the framework of motion compensated temporal filtering (MCTF), the motion information used for the update process being derived from the motion information used for the prediction process, the method employing a block based video codec composed of an encoder and a decoder. By way of example, the system 300 may represent a television, a set-top box, a desktop, laptop or palmtop computer, a personal digital assistant (PDA), a video/image storage device such as a video cassette recorder (VCR), a digital video recorder (DVR), or a personal video recorder device available from TiVo Inc., for example, as well as portions or combinations of these and other devices. In an exemplary embodiment, system 300 includes one or more video signal sources 305, one or more input/output (I/O) devices 310, and one or more display devices 315. In an embodiment, I/O device 310 includes a processor 320, a storage medium 325, an encoder 330, and a decoder 335. I/O device 310 may consist of an assembly of separate devices integrated into one, or may consist of discrete devices that communicate over a communication medium, such as a communication bus, a communication network (hardwire, optical or wireless), one or more internal connections of a circuit, circuit card or other device, as well as portions and combinations of these and other communication media.

An exemplary video signal source 305 may include or represent a television receiver, a VCR or any other video/image storage device, one or more network connections for receiving video from a server or servers over, for example, a global computer communications network such as the Internet, a wide area network, a metropolitan area network, a local area network, a terrestrial broadcast system, a cable network, a satellite network, a wireless network, a telephone network, or any portion or combination of such networks.

In an exemplary embodiment, the input data from video signal source 305 is processed in accordance with an embodiment of the invention using computer readable code stored in storage medium 325 and executed by processor 320 for generating output video/images supplied to the display device 315.

An embodiment of the invention may also be embodied in the form of a computer program product having computer program code containing instructions embodied in tangible media, such as floppy diskettes, CD-ROMs, hard drives, USB (universal serial bus) drives, or any other computer readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. The technical effect of the executable instructions is to decompose and reconstruct an input video signal that uses a prediction process and an update process in the framework of motion compensated temporal filtering (MCTF), wherein in response to the update and prediction processes being based on N reference pictures, with N being greater than one, the update process is split into N update processes using a single reference picture as an input picture, and the update process is executed on a received picture with respect to each input picture.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for temporal decomposition and reconstruction of an input video signal that uses a prediction process and an update process in framework of motion compensated temporal filtering (MCTF), the motion information used for the update process being derived from the motion information used for the prediction process, the method employing a block based video codec composed of an encoder and a decoder, the method comprising:

receiving a residual picture signal having a precision;

receiving a low-pass picture signal having a precision that is less than the precision of the residual picture signal;

in response to the residual picture signal being decoded in the decoder, clipping the residual picture signal such that the residual picture signal is reduced in precision, such that the low-pass picture signal, a reconstructed picture, and the clipped residual picture signal have equal precisions;

performing an inverse MCTF process, comprising a lifting scheme, on the clipped residual picture signal;

in response to the block based video codec selecting a block mode for each block, avoiding selecting a block mode in which a residual clipping would lead to breaking a perfect reconstruction property of the MCTF, thereby defining a constrained mode decision, wherein the constrained mode decision considers a mode in accordance with the following:

define $\hat{h}_c[x,k]=C(\hat{h}[x,k])$, where $d_{max}$ is used to determine whether to select a considered block mode, x is a vector describing a position of a pixel in a picture, k describes a temporal position of the picture, $\hat{h}[x,k]$ describes the residual picture signal, C is a clipping function C(w), $\hat{h}_C[x,k]$ are values stored in a storage medium, $$C(w) = \begin{cases} A_{min} & \text{if} & w < A_{min}, \\ A_{max} & \text{if} & w > A_{max}, \\ w & \text{otherwise}, \end{cases}$$

$A_{min}$ and $A_{max}$ are minimum and maximum values, respectively, that may be represented with b bits of precision in signed form, and w is an attribute of clipping function C(w);

$$\text{define } d_{max} = \max_{x \in B} |C'(\tilde{h}[x,\ k]) - \tilde{h}[x,\ k]|,$$

where
- B is a block being considered,
- C' is clipping function C modified such that $A'_{min}$ and $A'_{max}$ limits are used instead of $A_{min}$ and $A_{max}$, respectively with $A'_{min} \geq A_{min}$ and $A'_{max} \leq A_{max}$,
- $\hat{h}[x,k]$ is an estimation of the signal $\tilde{h}[x,k]$ that will be received at the decoder; and
- verify if $d_{max}$=0, and if not, forbid the considered mode from being selected for block B.

2. The method of claim 1, wherein the clipping of the residual picture signal comprises:
clipping the residual picture signal to a b-bit precision just after the signal is decoded, wherein the b-bit precision is equal to or less than the bit precision of the received low-pass picture signal.

3. The method of claim 2, wherein a value of b is 8.

4. The method of claim 1, further comprising:
in response to anticipated clipping of the residual picture signal at the decoder, using the clipped residual picture signal at the encoder during an update process, thereby resulting in an encoder process being closely matched to a decoder process.

5. The method of claim 4, wherein:
in response to no mode satisfying the condition $d_{max}$=0, then selecting a mode for which $d_{max}$ is below a defined threshold.

6. A device for temporal decomposition and reconstruction of an input video signal that uses a prediction process and an update process in a framework of motion compensated temporal filtering (MCTF), a motion information used for the update process being derived from the motion information used for the prediction process, the device employing a block based video codec comprising an encoder and a decoder, and a non-transitory computer-readable storage medium encoded with a computer program executable by a computer and configured to:
receive a residual picture signal having a precision;
receive a low-pass picture signal having a precision that is less than the precision of the residual picture signal;
in response to the residual picture signal being decoded in the decoder, clip the residual picture signal such that the residual picture signal is reduced in precision, such that the low-pass picture signal, a reconstructed picture, and the clipped residual picture signal have equal precisions;
performing an inverse MCTF process, comprising a lifting scheme, on the clipped residual picture signal; and
in response to the block based video codec selecting a block mode for each block, avoiding selecting a block mode in which a residual clipping would lead to breaking a perfect reconstruction property of the MCTF, thereby defining a constrained mode decision,
wherein the constrained mode decision considers a mode in accordance with the following:
define $\hat{h}_C[x,k]=C(\hat{h}[x,k])$, where
$d_{max}$ is used to determine whether to select a considered block mode,
x is a vector describing a position of a pixel in a picture,
k describes a temporal position of the picture,
$\hat{h}[x,k]$ describes the residual picture signal,
C is a clipping function C(w),
$\hat{h}_C[x,k]$ are values stored in a storage medium, $$C(w) = \begin{cases} A_{min} & \text{if } w < A_{min}, \\ A_{max} & \text{if } w > A_{max}, \\ w & \text{otherwise,} \end{cases}$$

$A_{min}$ and $A_{max}$ are minimum and maximum values, respectively, that may be represented with b bits of precision in signed form, and w is an attribute of clipping function C(w);

$$\text{define } d_{max} = \max_{x \in B} |C'(\tilde{h}[x,k]) - \tilde{h}[x,k]|,$$

where
- B is a block being considered,
- C' is di function C modified such that $A'_{min}$ and $A'_{max}$ limits are used instead of $A_{min}$ and $A_{max}$, respectively with $A'_{min} \geq A_{min}$ and $A'_{max} \leq A_{max}$,
- $\hat{h}[x,k]$ is an estimation of the signal $\hat{h}[h,x,k]$ that will be received at the decoder; and
- verify if $d_{max}$=0, and if not forbid the considered mode from being selected for block B.

7. A device for temporal decomposition and reconstruction of an input video signal that uses a prediction process and an update process in a framework of motion compensated temporal filtering (MCTF), a motion information used for the update process being derived from the motion information used for the prediction process, the device employing a block based video codec comprising an encoder and a decoder, the codec configured to facilitate:
receiving a residual picture signal having a precision;
receiving a low-pass picture signal having a precision that is less than the precision of the residual picture signal;
in response to the residual picture signal being decoded in the decoder, clipping the residual picture signal such that the residual picture signal is reduced in precision,
such that the low-pass picture signal, a reconstructed picture, and the clipped
residual picture signal have equal precisions;
performing an inverse MOT process, comprising a lifting scheme, on the clipped residual picture signal; and
in response to the block based video codec selecting a block mode for each block, avoiding selecting a block mode in which a residual clipping would lead to breaking a perfect reconstruction property of the MCTF, thereby defining a constrained mode decision,
wherein the constrained mode decision considers a mode in accordance with the following:
define $\hat{h}_C[x,k]=C(\hat{h}[x,k])$, where
$d_{max}$ is used to determine whether to select a considered block mode,
x is a vector describing a position of a pixel in a picture,
k describes a temporal position of the picture,
$\hat{h}[x,k]$ describes the residual picture signal,
C is a clipping function C(w),
$\hat{h}_C[x,k]$ are values stored in a storage medium, $$C(w) = \begin{cases} A_{min} & \text{if } w < A_{min}, \\ A_{max} & \text{if } w > A_{max}, \\ w & \text{otherwise,} \end{cases}$$

a $A_{min}$ and $A_{max}$ are minimum and maximum vlues, respectively, that may be represented with b bits of precision in signed form, and w is an attribute of function C(w);

$$\text{define } d_{max} = \max_{\chi \in B} \left| C'(\tilde{h}[x, k]) - \tilde{h}[x, k] \right|,$$

where
B is a block being considered,
C' is clipping function C modified such that A'$_{min}$ and A'$_{max}$ limits are used instead of A$_{min}$ and A$_{max}$, respectively with A'$_{min}$≧A$_{min}$ and A'$_{max}$≦A$_{max}$,
$\tilde{h}$[x,k] is an estimation of the signal $\hat{h}$[x,k] that will be received at the decoder; and
verify if d$_{max}$=0, and if not, forbid the considered mode from being selected for block B.

8. A method for temporal decomposition and reconstruction of an input video signal that uses a prediction process and an update process in framework of motion compensated temporal filtering (MCTF), the motion information used for the update process being derived from the motion information used for the prediction process, the method employing a block based video codec composed of an encoder and a decoder, the method comprising:
receiving a residual picture signal having a precision;
receiving a low-pass picture signal having a precision that is less than the precision of the residual picture signal;
in response to the residual picture signal being decoded in the decoder, clipping the residual picture signal such that the residual picture signal is reduced in precision, such that the low-pass picture signal, a reconstructed picture, and the clipped residual picture signal have equal precisions;
performing an inverse MOT process on the clipped residual picture signal;
in response to the block based video codec selecting a block mode for each block, avoiding selecting a block mode in which a residual clipping would lead to breaking a perfect reconstruction property of the MCTF, thereby defining a constrained mode decision; and
in response to the block based video codec specifying a variation of a prediction process that selects a motion vector for each block, avoiding selecting a motion vector that would lead to breaking the perfect reconstruction property of the MCTF, thereby defining a constrained motion estimation, wherein the constrained mode estimation considers a motion in accordance with the following:

define $\hat{h}_c$[x,k]=C($\hat{h}$[x,k]), where
d$_{max}$ is used to determine whether to select a considered block mode,
x is a vector describing a position of a pixel in a picture,
k describes a temporal position of the picture,
$\hat{h}$[x,k] describes the residual picture signal,
C is a clipping function C(w),
$\hat{h}_c$[x,k] are values stored in a storage medium, $$C(w) = \begin{cases} A_{min} & \text{if} & w < A_{min}, \\ A_{max} & \text{if} & w > A_{max}, \\ w & \text{otherwise}, \end{cases}$$

A$_{min}$ and A$_{max}$ are minimum and maximum values, respectively, that may be represented with b bits of precision in signed form, and w is an attribute of clipping function C(w);

$$\text{define } d_{max} = \max_{x \in B} \left| C'(\tilde{h}[x, k]) - \tilde{h}[x, k] \right|,$$

where
B is a block being considered,
C' is clipping function C modified such that A'$_{min}$ and A'$_{max}$ limits are used instead of A$_{min}$ and$_{Amax}$, respectively with
A'$_{min}$≧A$_{min}$ and A'$_{max}$≦A$_{max}$,
$\tilde{h}$[x,k] is an estimation of the signal $\hat{h}$[x,k] that will be received at the decoder; and
verify if d$_{max}$=0, and if not, forbid the considered mode from being selected for block B.

9. The method of claim 8, wherein the constrained motion estimation process considers a motion vector in further accordance with the following:
verify if d$_{max}$=0, and if not, then forbid the considered motion vector from being selected for block B.

10. The method of claim 9, wherein:
in response to no motion vector satisfying the condition d$_{max}$=0, then selecting a motion vector for which d max is below a defined threshold.

\* \* \* \* \*